United States Patent [19]

Laferty et al.

[11] 4,273,745
[45] Jun. 16, 1981

[54] PRODUCTION OF MOLYBDENUM OXIDE FROM AMMONIUM MOLYBDATE SOLUTIONS

[75] Inventors: John M. Laferty, Wheat Ridge; Dennis L. Howe, Arvada, both of Colo.; Roger F. Sebenik, Ann Arbor, Mich.

[73] Assignee: AMAX Inc., Greenwich, Conn.

[21] Appl. No.: 81,412

[22] Filed: Oct. 3, 1979

[51] Int. Cl.³ .......................................... C01G 39/02
[52] U.S. Cl. .................................. 423/54; 423/6; 423/11; 423/55; 423/58; 423/606
[58] Field of Search ............... 423/54, 58, 606, 11, 423/6, 55

[56] References Cited

U.S. PATENT DOCUMENTS

| | | | |
|---|---|---|---|
| 2,096,846 | 10/1937 | Donahue et al. | 423/58 |
| 3,288,570 | 11/1966 | Henrickson | 423/58 |
| 3,341,305 | 9/1967 | Kreevay et al. | 423/58 |
| 3,455,677 | 7/1969 | Litz | 423/54 |
| 3,681,016 | 8/1972 | Litz | 423/54 |
| 4,092,399 | 5/1978 | Narayan | 423/54 |
| 4,199,551 | 4/1980 | Laferty et al. | 423/54 |

Primary Examiner—Herbert T. Carter
Attorney, Agent, or Firm—Michael A. Ciomek

[57] ABSTRACT

Molybdenum is recovered from an ammonium molybdate solution containing phosphate anions by digesting in an ammonium molybdate solution at least one water-soluble compound of at least one metal selected from the group consisting of aluminum, calcium, iron and magnesium in small but effective amounts to precipitate at least about 50% of the phosphate anions for a time sufficient to precipitate the phosphate anion, separating the phosphate precipitate from the ammonium molybdate solution, then acidifying the ammonium molybdate solution with at least one mineral acid selected from the group consisting of sulfuric acid and nitric acid to lower the pH value of the solution to between about 2.5 and about 4.5 to precipitate ammonium polymolybdate, and calcining the ammonium polymolybdate at a temperature below about 750° C. to produce a molybdenum trioxide product.

14 Claims, 1 Drawing Figure

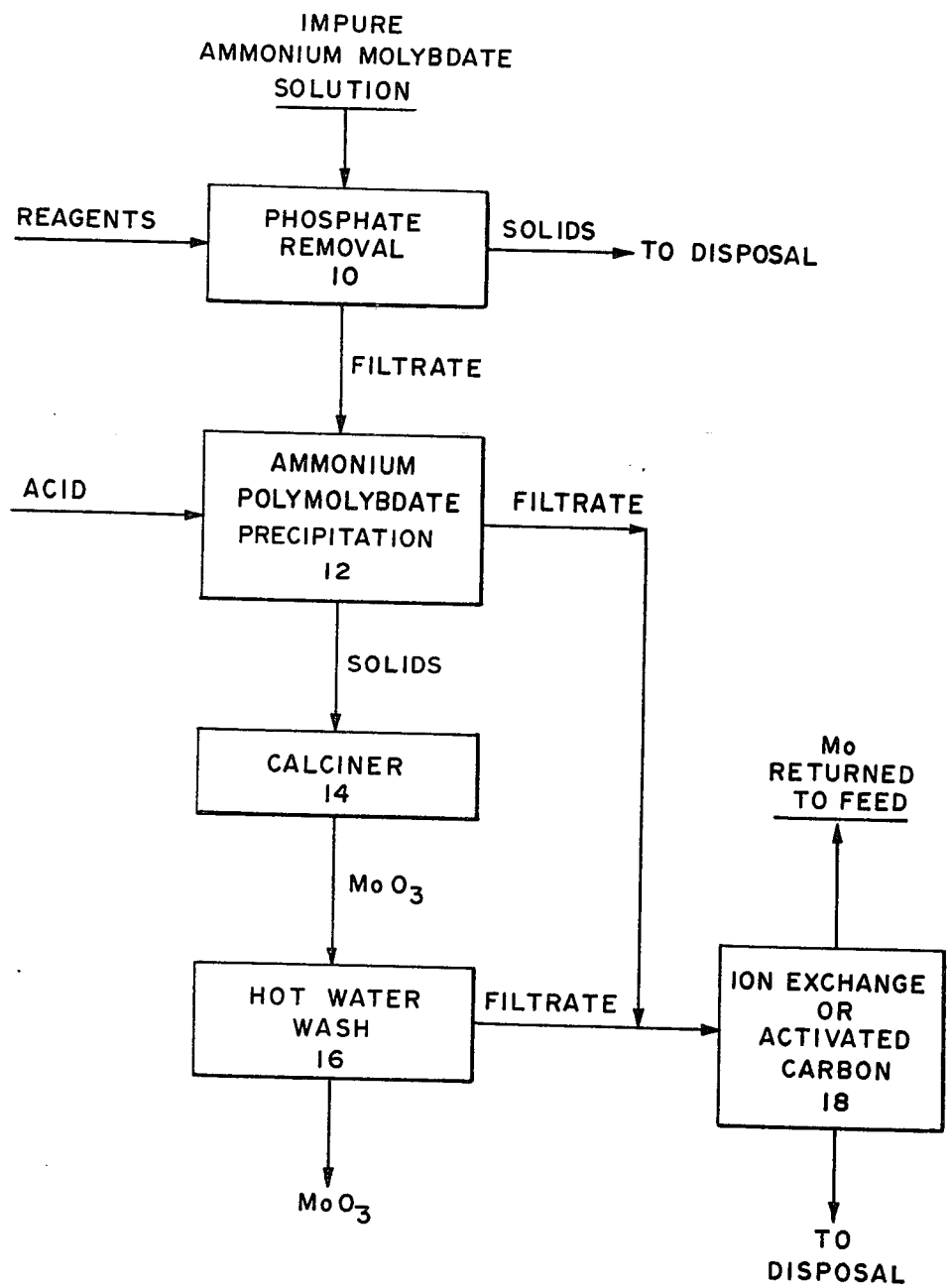

PRODUCTION OF MOLYBDENUM OXIDE FROM AMMONIUM MOLYBDATE SOLUTIONS

FIELD OF THE INVENTION

The present invention relates to hydrometallurgy, and more particularly to the recovery of molybdenum trioxide from ammonium molybdate solutions.

BACKGROUND OF THE INVENTION

Molybdenum is frequently copresent with uranium in uranium ores and is partially coextracted in the uranium leach liquors. In order to provide a commercially acceptable uranium product, the molybdenum content in the leach liquor is controlled to low levels, e.g., 20 parts per million (ppm). The molybdenum content in the leach liquor is maintained at such low levels by passing the leach liquor through an ion exchange resin or through a char column. When the ion exchange resin or the char become loaded, the resin or char is stripped to provide an aqueous molybdenum containing solution. Stripping is frequently conducted in such a fashion that the strip solution contains only small amounts of uranium and molybdenum and is disposed of in deep wells.

It has recently been discovered that by employing a two-stage strip—the first on the acid side and the second on the basic side using ammonium hydroxide—uranium and molybdenum can be selectively stripped to provide strip solutions having useful concentrations of these metals. Selective stripping is more fully described in U.S. Patent Application, Ser. No. 869,338, filed Jan. 13, 1978, which is incorporated herein by reference.

Although selective stripping as described in the aforementioned patent application provides ammonium molybdate solutions that can be readily treated for molybdenum recovery, the amount of molybdenum coproduced with uranium is comparatively small and any process for recovering and refining such small amounts of molybdenum must be simple with small capital requirements to be economically viable. Not only must the process be simple but it must also be effective in producing a molybdenum product having exceptionally low levels of phosphorus, sulfur, lithium, sodium, potassium, and uranium.

BRIEF DESCRIPTION OF THE INVENTION

Briefly stated, the present invention comprises providing an ammonium molybdate solution containing phosphate anions. At least one water-soluble compound of at least one metal selected from the group consisting of aluminum, calcium, iron and magnesium in small but effective amounts to precipitate at least about 50% of the phosphate anions is digested in the ammonium molybdate solution for a time sufficient to precipitate the phosphate anion. After separating the phosphate precipitate from the ammonium molybdate solution, the ammonium molybdate solution is acidified with at least one mineral acid selected from the group consisting of sulfuric acid and nitric acid to lower the pH value of the solution to between about 2.5 and about 4.5 to precipitate ammonium polymolybdate. After liquid-solid separation, the ammonium polymolybdate is calcined at a temperature below about 750° C. to produce a molybdenum trioxide product.

DRAWINGS

The FIGURE is a blockflow diagram of an advantageous embodiment of the process in accordance with the present invention for treating an impure ammonium molybdate solution to ultimately recover a pure molybdenum trioxide product.

DETAILED DESCRIPTION

Referring now to the FIGURE there is disclosed an advantageous embodiment for treating an impure ammonium molybdate solution derived from sequentially stripping a loaded ion exchange column or a char column from which loaded uranium values are first stripped with a weakly acid solution and then the loaded molybdenum values are recovered by stripping with an ammoniacal ammonium solution to produce an impure ammonium molybdate solution. The impure ammonium molybdate solution is fed to tank 10 to which at least one precipitant consisting of a water-soluble compound of at least one metal selected from the group consisting of aluminum, calcium, iron and magnesium in small but effective amounts to precipitate at least about 50% of the phosphate anions in the molybdate solutions is added. The precipitant is digested for a time sufficient to precipitate the phosphate anion. After liquid-solids separation, the filtrate from 10 is fed to tank 12 where at least one mineral acid selected from the group consisting of sulfuric acid and nitric acid is added to the filtrate to lower the pH value thereof to a value between about 2.5 and about 4.5 to precipitate ammonium polymolybdate. After liquid-solid separation, the ammonium polymolybdate is fed to calciner 14 where the ammonium polymolybdate is heated to a temperature below about 750° C. to produce a molybdenum trioxide product. The molybdenum trioxide product, if it contains an alkali metal, is washed with hot water in tank 16 to produce an acceptable high grade molybdenum trioxide product. The filtrates from ammonium polymolybdate precipitation from the hot water wash are combined and fed to ion exchange or activated carbon columns 18 to lay the residual molybdenum contents thereon. When ion exchange or activated carbon column 18 is loaded with molybdenum values, the loaded molybdenum values can be stripped with an ammonium hydroxide solution to produce an ammonium molybdate solution which is combined with additional impure ammonium molybdate solution and the combined solution is fed to tank 10.

The process in accordance with the present invention can be employed to recover molybdenum trioxide from ammonium molybdate solutions derived from any source. However, the process in accordance with the present invention is most useful in treating impure ammonium molybdate solutions derived from the selective stripping of molybdenum from char columns or ion exchange columns used in the uranium industry to remove molybdenum from uranium leach liquors. Such ammonium molybdate solutions can contain between about 15 and about 60 grams per liter (gpl) molybdenum and major impurities including chloride ions, sulfate ions, phosphate ions, and alkali metals such as sodium, potassium, and lithium and have a pH value between about 7 and about 10. Typical ammonium molybdate solutions that can be treated by the process in accordance with the present invention are shown in Table I.

TABLE I

COMPOSITION OF A TYPICAL CARBON STRIP SOLUTION

| Component | Concentration |
|---|---|
| Mo | 15–60 gpl |
| $NH_4^+$ | 15–30 gpl |
| $SO_4^=$ | 1–3 gpl |
| Cl— | 0.5–1.0 gpl |
| U | 2–10 ppm |
| Na | 0.5–1.0 gpl |
| K | 20–30 ppm |
| Ca | 20–40 ppm |
| Li | 0.5–1.0 gpl |
| Si | 225 ppm |
| As | 20 ppm |
| Se | 40 ppm |
| P | 100 ppm |

Impure ammonium molybdate solutions are obtained from leaching uranium ores with an ammonium carbonate-bicarbonate solution to produce a pregnant solution containing uranium and molybdenum. The pregnant solution is passed through an ion exchange resin where the metal values uranium and a portion of molybdenum are extracted. The metal values are stripped from the ion exchange resin using a solution of sodium chloride, sodium carbonate and ammonia and the resulting solution containing, for example, about 1.5 gpl Mo and 7 to 8 gpl $U_3O_8$ is acidified with $H_2SO_4$ to a pH of about 2 and then passed through a bed of activated charcoal to selectively remove the molybdenum. This provides a purified solution of uranium containing 7 to 8 gpl $U_3O_8$ and up to about 40 ppm Mo.

The activated charcoal or char which contains substantial amounts of molybdenum and some uranium is contacted with an ammonia solution substantially free of carbonate at a pH value in excess of about 6. The concentration of said ammonia solution is such as to provide a pregnant solution containing at least about 15 gpl molybdenum and substantially less than about 500 ppm $U_3O_8$, such as below about 200 or 100 ppm $U_3O_8$. The ammonia solution is one obtained by bubbling ammonia through water or it may be ammonia hydroxide. The term "substantially free of carbonate" is understood to include the presence of small amounts of carbonate that do not adversely affect the selectivity of the process. Advantageously, the char column is sequentially stripped by first stripping uranium from the char with an aqueous acid solution (e.g., a mineral acid such as $H_2SO_4$) at a pH value less than about 5.5, for example, 2 to 5, and thereafter stripping the molybdenum on said char with an ammonia solution to provide a pregnant solution containing at least about 15 gpl molybdenum.

Although the sequential stripping of char columns or ion exchange columns can produce ammonium molybdate strip solutions having uranium contents below about 500 ppm $U_3O_8$, molybdenun trioxide products containing such high uranium values may be commercially unacceptable. An advantageous feature of the present invention is to age the ammonium molybdate strip solution for a time sufficient to allow a preponderant part of the uranium values to precipitate from the ammonium molybdate solution. Such aging periods can range between about 1 and about 7 days and advantageously between about 2 and about 5 days. Aging the ammonium molybdate strip solution for times within the foregoing ranges can lower the $U_3O_8$ content thereof from about 500 or 200 ppm $U_3O_8$ to less than about 10 ppm or even 3 ppm $U_3O_8$.

The impure ammonium molybdate strip solution, with or without aging to remove excessive amounts of $U_3O_8$, is treated to remove phosphates. Phosphates are removed by digesting a precipitant of at least one water-soluble compound or at least one metal selected from the group consisting of aluminum, calcium, iron and magnesium in small but effective amounts to precipitate at least about 50% of the phosphate anions in the molybdate solution. Digestion of the precipitant in the ammonium molybdate strip solution is conducted for a time sufficient to precipitate most of the phosphate anion. The amount of precipitant added to the ammonium molybdate solution is generally at least that required to satisfy stoichiometrically the reaction between the metal in the precipitant and the phosphate in the ammonium molybdate solution to form the phosphate of the precipitant. Advantageously, the amount of the precipitant added to the ammonium molybdate solution is at least 25% in excess of that required to satisfy stoichiometrically the reaction between the metal and the precipitant and the phosphate content of the molybdate solution. For example, when employing magnesium sulfate septahydrate to precipitate the phosphate anion a magnesium to phosphorus ratio of about 1.1 will precipitate about 88% of the phosphate. As another example, when using aluminum trichloride hexahydrate an aluminum to phosphate molar ratio of about 4 precipitates about 89% of the phosphorus. Precipitants that can be employed include magnesium sulfate, aluminum chloride, aluminum sulfate, ferric chloride, ferric sulfate. Not only does this treatment remove phosphorus, but other impurities such as calcium, selenium, arsenic, silicon and uranium are removed with the precipitate. Digestion and precipitation can be conducted at temperatures between about 20° C. and about 80° C. with digestion times of at least one hour, advantageously between about 1 hour and about 2 hours. Digestion of the precipitant and precipitation of phosphorus can be conducted in an open tank and is advantageously equipped with agitators, such as motor driven impellers, in order to minimize concentration gradients within the solution thereby facilitating precipitation of phosphorus and other impurities.

After conventional liquid-solids separation of the phosphate precipitate, the purified ammonium molybdate solution is treated to recover ammonium polymolybdate. The concentration of the molybdenum in the solution is generally about 25 gpl and about 50 gpl. However, ammonium molybdate solutions containing between about 15 gpl and about 150 gpl can be treated to recover ammonium polymolybdate. Higher molybdenum concentrations within the foregoing ranges are desirable because ammonium polymolybdate is slightly soluble and higher molybdenum recoveries are realized from more concentrated solutions. Advantageously, molybdenum recoveries can be increased by concentrating the ammonium molybdate solution by evaporation. Ammonium polymolybdate is precipitated from the solution by acidifying the solution with at least one mineral acid selected from the group consisting of sulfuric acid or nitric acid. When using nitric acid the concentration should be greater than about 25% $HNO_3$. When using sulfuric acid the concentration should be between about 20% and about 50% $H_2SO_4$. Lower acid concentrations result in excess dilution of the ammonium molybdate solution thereby lowering molybdenum recoveries. Sulfuric acid concentrations greater than about 50% result in a somewhat violent reaction.

Precipitation of ammonium polymolybdate can be carried out at temperatures between about 20° C. and 100° C. Advantageously, precipitation of ammonium polymolybdate is conducted at temperatures close to the boiling point. Precipitation of ammonium polymolybdate at or near the boiling point drives off a substantial part of the ammonia which results in lower acid requirements. For example, at 100° C. acid consumption was about 0.6 gram of sulfuric acid per gram of molybdenum precipitated, while at 25° C. the acid consumption was about 0.86 gram sulfuric acid per gram of molybdenum precipitated. In addition to acid savings precipitation of ammonium polymolybdate at higher temperatures results in improved kinetics. The amount of acid added to the ammonium molybdate solution should be sufficient to lower the final pH of the solution to a value between about 2.5 and about 4.5 and advantageously to a value between about 3.0 and 4.0. Acid additions that are effective in reducing the pH to the foregoing ranges insure that as much as about 99% of the molybdenum in solution is precipitated while acid consumption is minimized. After the acid has been added to the ammonium molybdate solution the solution should be held at the reaction temperature for at least about 2 hours to allow complete precipitation of ammonium polymolybdate. Shorter retention times can result in incomplete precipitation.

An advantageous feature of the present invention is to oxidize the ammonium molybdate solution either prior to or during acidification of the solution to insure that substantially all the molybdenum in the solution is in the molybdate form. Examples of oxidants that can be employed to insure that the molybdenum is in the molybdate state include hydrogen peroxide, ferric ions, gaseous chlorine and oxygen. The amount of oxidant added to the ammonium molybdate solution is proportional to the amount of reduced species in the solution. As an example, in one instance an addition of 7 milliliters of 10% $H_2O_2$ per gram of molybdenum increases molybdenum recovery from about 97% to about 99%.

Ammonium polymolybdate is recovered from the acidified solution by conventional solids-liquid separation techniques such as filtration. The ammonium polymolybdate precipitate is treated to recover molybdenum trioxide and the filtrate can be treated to recover residual molybdenum by passing the filtrate through an ion exchange resin or activated carbon column. Ion exchange resin absorption is preferred because the pH of the filtrate (between about 3 and about 4) is in the preferred range for molybdenum absorption on weakly basic amine type resins, e.g., an amine resin sold under the trademark AMBERLITE IRA-99 manufactured and sold by Rohm & Hass. When the ion exchange resin or activated carbon is loaded the molybdenum can be stripped therefrom with an ammonium hydroxide solution. The ammonium hydroxide solution can be made from fresh reagents or impure ammonium molybdenum solution can be employed. If the plant feed solution is used, it may be necessary to increase the ammonium hydroxide concentration in order to insure more complete stripping of molybdenum from the ion exchange resin or the activated carbon. This strip solution is then blended with the plant feed solution.

The ammonium polymolybdate precipitate is dried and calcined to molybdenum trioxide at a temperature less than about 700° C. advantageously at a temperature between about 450° C. and about 500° C. Although higher calcining temperatures can be employed, it has been found to be particularly advantageous to calcine at temperatures below about 500° C. so that upon washing impurities such as potassium, sodium and lithium can be easily leached therefrom. Calcining at temperatures higher than about 550° C. appears to result in various reactions between the alkali metals and the molybdenum trioxide which, unless special precautions are taken, render the alkali metals inactive to hot water leaching. A typical analysis of the calcine is shown in Table II.

TABLE II

CONCENTRATIONS OF IMPURITIES IN THE MOLYBDENUM TRIOXIDE AFTER CALCINING

| Component | Concentration |
| --- | --- |
| $Cl^-$ | 0.01% |
| $SO_4^=$ | 0.085% |
| U | 1 ppm |
| K | 100 ppm |
| Na | 230 ppm |
| Ca | 185 ppm |
| Li | 3 ppm |
| As | 20 ppm |
| P | 0.02% |
| Se | 10 ppm |

The molybdenum trioxide obtained by calcination is advantageously washed with hot water for further purification. Advantageously hot washing is conducted with water maintained at a temperature between about 50° C. and about 85° C. with molybdenum trioxide being added thereto in amounts to form slurries containing between about 20% solids and 40% solids by weight. The higher temperatures within the foregoing ranges are desired in order to insure more complete removal of the various impurities such as potassium, sodium, calcium, lithium and the like. Slurries within the foregoing ranges are desired in that these densities insure maximum removal of the impurities while minimizing molybdenum losses to the hot water. Lower solids densities increase molybdenum losses while increasing impurity removal. Higher densities result in lower molybdenum losses and lower impurity removal. Typical analysis of products obtained after hot washing are shown in Table III.

TABLE III

CONCENTRATIONS OF IMPURITIES IN THE $MoO_3$ AFTER HOT WATER WASHING

| Component | Concentration |
| --- | --- |
| $Cl^-$ | 0.01% |
| $SO_4^=$ | 0.01% |
| K | 5-13 ppm |
| Na | 35-88 ppm |
| Ca | 25 ppm |
| Li | 2 ppm |
| As | 16 ppm |
| P | 0.005% |
| Se | 6 ppm |

After hot washing the molybdenum trioxide product is separated and dried for marketing. The wash solution, after pH adjustment if necessary, is passed through an ion exchange or activated carbon column to absorb the molybdenum contained therein. The hot wash water can be combined with the solution from which ammonium polymolybdate has been precipitated and then fed to the activated charcoal or ion exchange column for absorption thereof. Again, upon being loaded, the column can be stripped with ammonium hydroxide or fresh plant feed solution to recover the molybdenum which is recycled to the phosphate precipitation step.

In order to give those skilled in the art a better appreciation of the advantages flowing from the practice of the present invention, the following illustrative example is given:

EXAMPLE I

An impure ammonium molybdate solution was produced at a Texas uranium operation according to the stripping procedure described in patent application Ser. No. 869,338, filed Jan. 13, 1978. The solution as received had a composition as shown in Table IV.

TABLE IV

Composition of the impure ammonium molybdate solution as received:

| COMPONENT | CONCENTRATION |
|---|---|
| Mo | 39.1 g/l |
| U | 0.0034 g/l |
| P | 0.132 g/l |
| S | 2.67 g/l |
| Cl | 7.9 g/l |
| Al | 0.003 |
| As | 0.02 |
| Ca | 0.077 |
| Cu | 0.0006 |
| Fe | 0.0012 |
| K | 0.069 |
| Li | 0.0006 |
| Mg | 0.013 |
| Na | 0.30 |
| Ni | 0.0002 |
| Pb | 0.0001 |
| Se | 0.06 |
| Si | 0.055 |

The removal of phosphate ions was then accomplished by adding aluminum sulfate to the solution to achieve an aluminum to phosphate molar ratio of four. The precipitate that formed resulted in the removal of 66.5% of the phosphorus and 86.5 percent of the uranium from the solution. The phosphate removal step was carried out at room temperature and pH 7.0 with a contact time of 10 minutes.

The phosphorus-free solution was then heated to 100° C. (without reflux condensation) and, while stirring, a 20% $H_2SO_4$ was slowly added until the solution pH reached 3.0 to precipitate an ammonium polymolybdate. A 10% solution of $H_2O_2$ at a rate of 9 ml/g Mo was also added. The slurry was held at 100° C. while stirring for 2 hours and then cooled to room temperature (requiring an additional 2 hours) before filtering. A volume decrease of about 50% occurred during this operation.

The ammonium polymolybdate filter cake was then calcined at 600° C. for one hour to convert it to molybdenum trioxide. Purification of this molybdenum trioxide was achieved by slurrying with water at 28 percent solids and 50° C. for 15 minutes. The slurry was then filtered and the molybdenum trioxide filter cake dried at 50° C. Table V shows the composition of the molybdenum trioxide immediately after calcining and after purification by hot water leaching.

TABLE V

Analysis of molydbenum trioxide after calcining and after hot water leaching:

| COMPONENT | CONCENTRATION After Calcining | After Hot Water Leaching |
|---|---|---|
| Mo | 66.5 | 66.5 |
| U | 00.0066 | 0.0066 |
| P | 0.0015 | 0.002 |
| S | 0.006 | 0.003 |
| Al | 0.0050 | 0.0045 |
| As | 0.0067 | 0.0005 |
| Ca | 0.0020 | 0.0018 |
| Cu | 0.0012 | 0.0004 |
| Fe | 0.0003 | 0.0005 |
| K | 0.0256 | 0.0037 |
| Li | 0.0008 | 0.0008 |
| Mg | 0.0008 | 0.0002 |
| Na | 0.0023 | 0.0039 |
| Ni | 0.0024 | 0.0023 |
| Pb | 0.0003 | 0.0003 |
| Sc | 0.0002 | 0.0002 |
| Si | 0.0060 | 0.0030 |

Although the present invention has been described in conjunction with advantageous embodiments, it is to be understood that modifications and variations may be resorted to without departing from the spirit and scope of the invention as those skilled in the art will readily understand. Such modifications and variations are considered to be within the purview and scope of the invention and appended claims.

We claim:

1. A process for recovering molybdenum trioxide from an ammonium molybdate solution containing phosphate anions and more than about 500 ppm $U_3O_8$ which comprises aging the ammonium molybdate solution to lower the $U_3O_8$ content to less than about 10 ppm, digesting a precipitant of at least one water-soluble compound of at least one metal selected from the group consisting of iron, calcium, aluminum and magnesium in small but effective amounts to precipitate at least about 50% of the phosphate anions in the ammonium molybdate solution for a time sufficient to precipitate the phosphate anions, separating the phosphate precipitate from the ammonium molybdate solution, then acidifying the ammonium molybdate solution with at least one mineral acid selected from the group consisting of sulfuric acid and nitric acid to provide a final pH value of between about 2.5 and about 4.5 to precipitate an ammonium polymolybdate compound and calcining the ammonium polymolybdate compound at a temperature below about 700° C. to produce a molybdenum trioxide product.

2. The process as described in claim 1 wherein the precipitant is at least one member selected from the group consisting of calcium chloride, magnesium sulfate, magnesium chloride, aluminum sulfate, aluminum chloride, ferric chloride, and ferric sulfate.

3. The process as described in claim 2 wherein the amount of the precipitant is at least equal to that required to satisfy stoichiometrically the reaction between the phosphate anion in solution and the precipitant metal to form phosphates of the precipitate.

4. The process as described in claim 3 wherein the precipitant is digested for a time between about 0.25 hour and about 1 hour.

5. The process as described in claim 4 wherein the precipitant is digested at a temperature between about 20° C. and 100° C.

6. The process as described in claim 5 wherein the ammonium molybdate solution is acidified at a temperature between about 20° C. and 100° C.

7. The process as described in claim 6 wherein the ammonium molybdate solution is maintained near the boiling point during acidification.

8. The process as described in claim 7 wherein an oxidant is added to the ammonium molybdate solution in small but effective amounts to insure that substantially all of the molybdenum values contained in the solution are in the molybdate state.

9. The process as described in claim 8 wherein the oxidant is at least one member selected from the group consisting of hydrogen peroxide, gaseous chlorine, ferric chloride, ferric sulfate, oxygen, air and ozone.

10. The process as described in claim 9 wherein the ammonium molybdate solution contains at least one alkali metal a portion of which reports in the molybdenum trioxide product and the molybdenum trioxide product is washed with hot water to leach the alkali metal and other impurities therefrom.

11. The process as described in claim 10 wherein the hot wash is conducted with water maintained at a temperature between about 50° C. and about 85° C. and molybdenum trioxide is added to the wash water in an amount to provide a slurry containing between about 20% solids and about 40% solids by weight.

12. The process as described in claim 10 wherein the solution from which ammonium polymolybdate is precipitated and the wash solution are combined and are passed through a column containing a molybdenum absorbent selected from the group consisting of a weakly basic amine resin or activated carbon.

13. The process as described in claim 11 wherein when the molybdenum absorbent becomes loaded the absorbed molybdenum is recovered by stripping with an ammonium hydroxide solution to provide a strip solution which is recycled to the phosphate precipitation step.

14. The process as described in claim 11 wherein the molybdenum trioxide is produced by roasting the ammonium polymolybdate compound at a temperature between about 450° C. and 500° C.

* * * * *